United States Patent [19]

Mawhinney et al.

[11] Patent Number: 5,053,776
[45] Date of Patent: Oct. 1, 1991

[54] DEVICE AND METHOD FOR THE TELEMETRIC MEASUREMENT OF A DISTANCE AND APPLICATION TO A RADAR PROBE FOR DETERMINING THE TOPOGRAPHIC MAP OF THE LOADING SURFACE OF A SHAFT FURNACE

[75] Inventors: Daniel D. Mawhinney, Livingston, N.J.; Emile Lonardi, Bascharage; Emile Breden, Godbrange, both of Luxembourg; Jeannot Loutsch, Howald, Luxembourg

[73] Assignee: Paul Wurth S.A., Luxembourg, Luxembourg

[21] Appl. No.: 579,937

[22] Filed: Sep. 6, 1990

[30] Foreign Application Priority Data

Sep. 7, 1989 [LU] Luxembourg ............................ 87577

[51] Int. Cl.⁵ .............................................. G01S 13/08
[52] U.S. Cl. ...................................... 342/124; 342/118
[58] Field of Search .................. 342/124, 59, 118, 126, 342/465

[56] References Cited

U.S. PATENT DOCUMENTS 2,420,408  5/1947  Behn ...................................... 342/126

FOREIGN PATENT DOCUMENTS 0122983  5/1988  Japan ...................................... 342/118

Primary Examiner—Gilberto Barrón, Jr.
Attorney, Agent, or Firm—Fishman, Dionne & Cantor

[57] ABSTRACT

The device includes a transmitting antenna which also serves as a receiving antenna and a separate receiving antenna for receiving the signals transmitted by the transmitting antenna and reflected at the point of reflection, and two data processing units, one for the signals picked up by the transmitting and receiving antenna and transmitted through a circulator and a first mixer, the other for the signals picked up by the receiving antenna and transmitted through a second mixer. The distance measurement is computed using the signals picked up by the transmitting and receiving antenna for distances less than a predetermined threshold and using the signals picked up by the receiving antenna for distances greater than the predetermined threshold.

18 Claims, 3 Drawing Sheets

DEVICE AND METHOD FOR THE TELEMETRIC MEASUREMENT OF A DISTANCE AND APPLICATION TO A RADAR PROBE FOR DETERMINING THE TOPOGRAPHIC MAP OF THE LOADING SURFACE OF A SHAFT FURNACE

TECHNICAL FIELD

The present invention relates to a device and method for the telemetric measurement of the distance of a point of reflection of electromagnetic waves transmitted and received by means of a radar probe and the application of this device and method to the determination of the topographic map of the loading surface of a shaft furnace.

BACKGROUND OF THE INVENTION

The use of radar probes for the determination of the profile of the loading surface of a shaft furnace has been known for some time and is described, e.g. in U.S. Pat. No. 4,744,010, the disclosure of which is incorporated by reference. Radar probes have, in effect, several important advantages with respect to mechanical probes, the most important of which is that of speed of measurement which allows, e.g. the measurement of several points or the carrying out of a scanning in order to determine the profile of the loading surface, contrary to the most of the mechanical probes which can only carry out spot measurements. Unfortunately, these radar probes had, up to the present time, the handicap of being much more expensive than mechanical probes. However, the reduction in the price of electronic components is making radar probes more and more competitive.

Among radar probes two different types are essentially distinguished, namely the so-called monostatic probes, i.e., those which have a single antenna serving as both a transmitter and receiver of radar waves and the so-called bistatic probes which comprise two separate antennas, one serving as a transmitting antenna and the other serving as a receiving antenna for the reflected radar waves. Each type of probe has its very specific advantages and disadvantages. Thus, for example, monostatic probes must comprise means, such as a magnetic core circulator, for separating the received signal from the transmitted signal, whose amplitude is generally larger. The major disadvantage of monostatic probes, particularly in continuous mode, i.e., non-pulsed, is the poor capability of separating the transmitted signal from the received signal. The advantage of the monostatic probe is its mechanical simplicity and a larger antenna aperture, i.e., a more sensitive gain for a given aperture.

The advantage of a bistatic probe is that it allows a better separation between the transmitted signal and the received signal. On the other hand, the disadvantage of bistatic antennas is the oblique path of the radar beam between the transmitter and the receiver, i.e., the angle of reflection. Given that this angle of reflection increases as the distance to be measured decreases, bistatic probes are less suitable for measuring short distances.

SUMMARY OF THE INVENTION

The object of the present invention is to provide a method and a device for the telemetric measurement of a distance using a radar beam which offers the advantages cf bistatic probes and of monostatic probes.

In order to achieve this objective, the present invention proposes a device for the telemetric measurement of the distance of a point of reflection of electromagnetic waves transmitted and received by means of a radar probe, characterized by transmitting antenna which also serves as a receiving antenna and by a receiving antenna for receiving the signals transmitted by the transmitting antenna and reflected at the point of reflection and by two data processing units one for the signals picked up the transmitting and receiving antenna and transmitted through a circular and a first mixer, the other for the signals picked up by the receiving antenna and transmitted through a second mixer.

The device preferably comprises a comparator for comparing the measurement signals provided by each of the processing units.

The invention also provides a telemetric measuring method, using this device, which is characterized in that the distance is computed using the signals picked up by a transmitting and receiving antenna for distances of less than a predetermined threshold and using the signals picked up by the receiving antenna for distances greater than the predetermined threshold.

The two distances computed from the signals picked up by each of the two antennas can also be compared continuously for control purposes in order to be able to repeat the measurement when the difference between the two distances exceeds a predetermined value.

In other words, the device proposed by the present invention preferably operates in monostatic mode for the measurement of short distances and in bistatic mode for longer distances, the switching from one mode to the other being able to be carried out automatically starting from an arbitrarily determined distance or able to be commanded under the control of a comparison of the measurements carried out by each of the two operating modes.

BRIEF DESCRIPTION OF THE DRAWINGS

Other features and characteristics will emerge from the detailed description of a advantageous embodiment described below by way of illustration and with reference to the appended drawings in which.

DETAILED DESCRIPTION OF THE INVENTION

Figure 1:
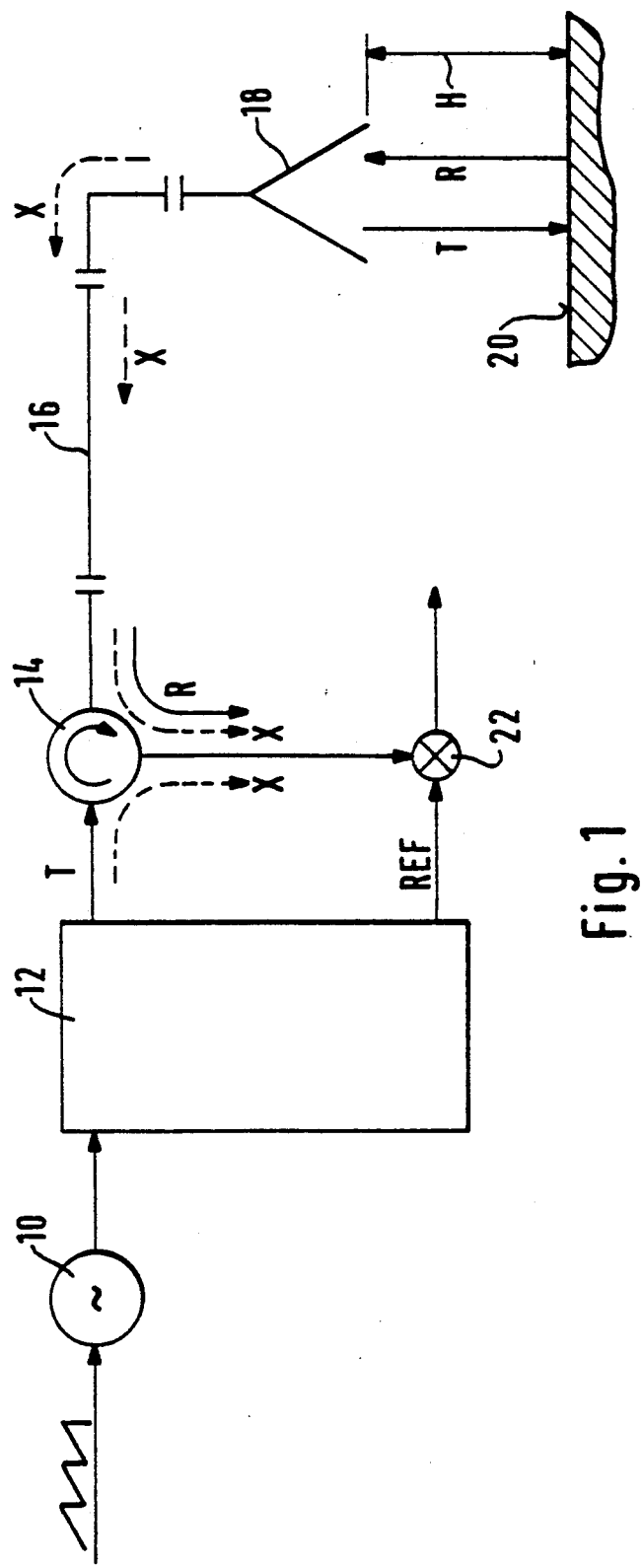
FIG. 1 is a block diagram of a known monostatic antenna probe.

The probe shown in FIG. 1 comprises a high frequency oscillator 10 which is controlled, in a manner which is known per se, by a modulator in order to generate a frequency modulated signal. This signal is divided in a divider 12 into a transmitted signal T and a reference signal REF. The signal T is transmitted through a circulator 14 and a waveguide 16 to a monostatic antenna 18 which transmits a modulated microwave beam T towards the surface 20 whose distance is to be measured and which picks ups the signals R reflected by this surface. The reflected signal R thus picked up by the antenna 18 is transmitted back through the waveguide 16 to the circulator 14 which is a kind of electronic switch or switching the signal R towards a mixer 22. In this mixer 22 the reflected signal R is identified by comparison with the reference signal REF and is then sent to a data processing unit for computing, in a manner which is known per se, the height H between the antenna 18 and the reflection surface 20.

As mentioned above, a monostatic antenna has the disadvantage that is difficult to identify the reflected signal R correctly. In effect, even in the case of optimum operation of the circulator and of the waveguide 16, a portion of the transmitted signal T is deflected through the circulator 14 towards the mixer 22, while reflections occurring in the waveguide and other signals return towards the circulator and the mixer, all of these parasitic signals being represented by X in FIG. 1. From then onwards it is difficult to distinguish between the parasitic signals X and the measurement signals T. Also given that the parasitic reflections vary as a function of frequency, a wide frequency modulation band gives rise to large parasitic signals which cannot be eliminated in a filter. The problem is aggravated as the measurement height H increases, because the signals reflected on the surface 20 become much weaker and can be masked by the parasitic signals. On the other hand, for short distances, the reflected signals R are much larger and interference with the parasitic signals has less effect.

Figure 2:
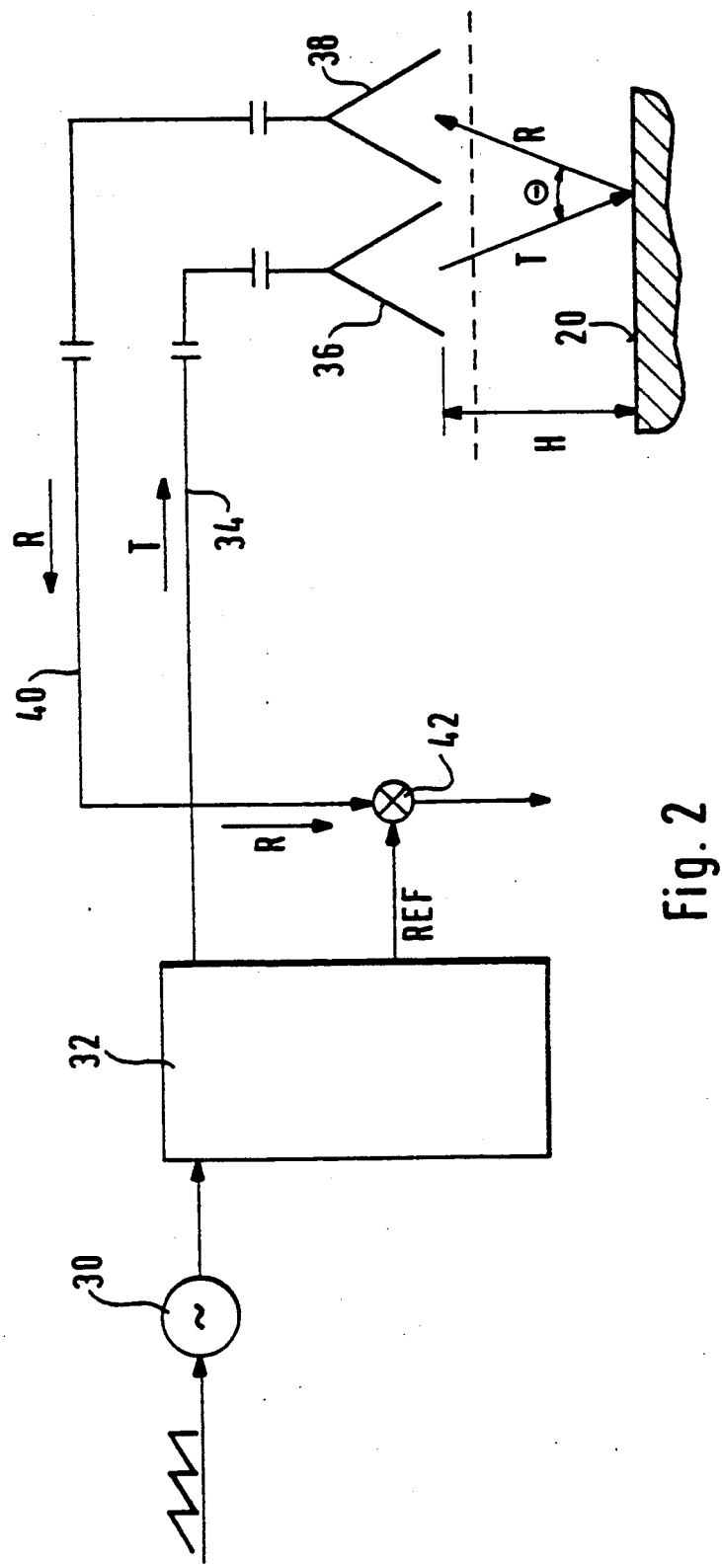
FIG. 2 is a block diagram of a known bistatic antenna probe.

FIG. 2 shows a so-called bistatic radar probe. A frequency modulated signal is generated by a high frequency oscillator 30 and separated in the divider 32 into a reference signal REF and a transmitted signal T. The latter is sent through a waveguide 34 and a transmitting antenna 26 on to the surface 20 whose distance is required to be measured and the signal R reflected by he latter is picked up by a separate receiving antenna 38. The reflected signal R is sent through a waveguide 40 and is identified in the mixer 42 by comparison with the reference signal before being processed in a data processing unit in order to compute, in a manner which is known per se, the height H. This system has the advantage that there is no crossing between the transmitted signals and the reflected signals such that there is a better detection of the reflected signal, which makes this system advantageous when the reflected signal is weak, i.e., for relatively large heights H.

On the other hand, this system suffers from a handicap with respect to monostatic antennas when the measurements are made at a short distance from the reflection surface 20. In effect, given that the two antennas 36 and 38 are placed side by side, the reflected signal R is picked up at a certain reception angle $\theta$ and this angle must be taken into consideration in computing the height H, particularly when the latter reduces. At very short distances, this angle even becomes so large that it can block the correct reception by the antenna 38 and make the data processing and the computation of the height H difficult or even impossible.

Figure 3:
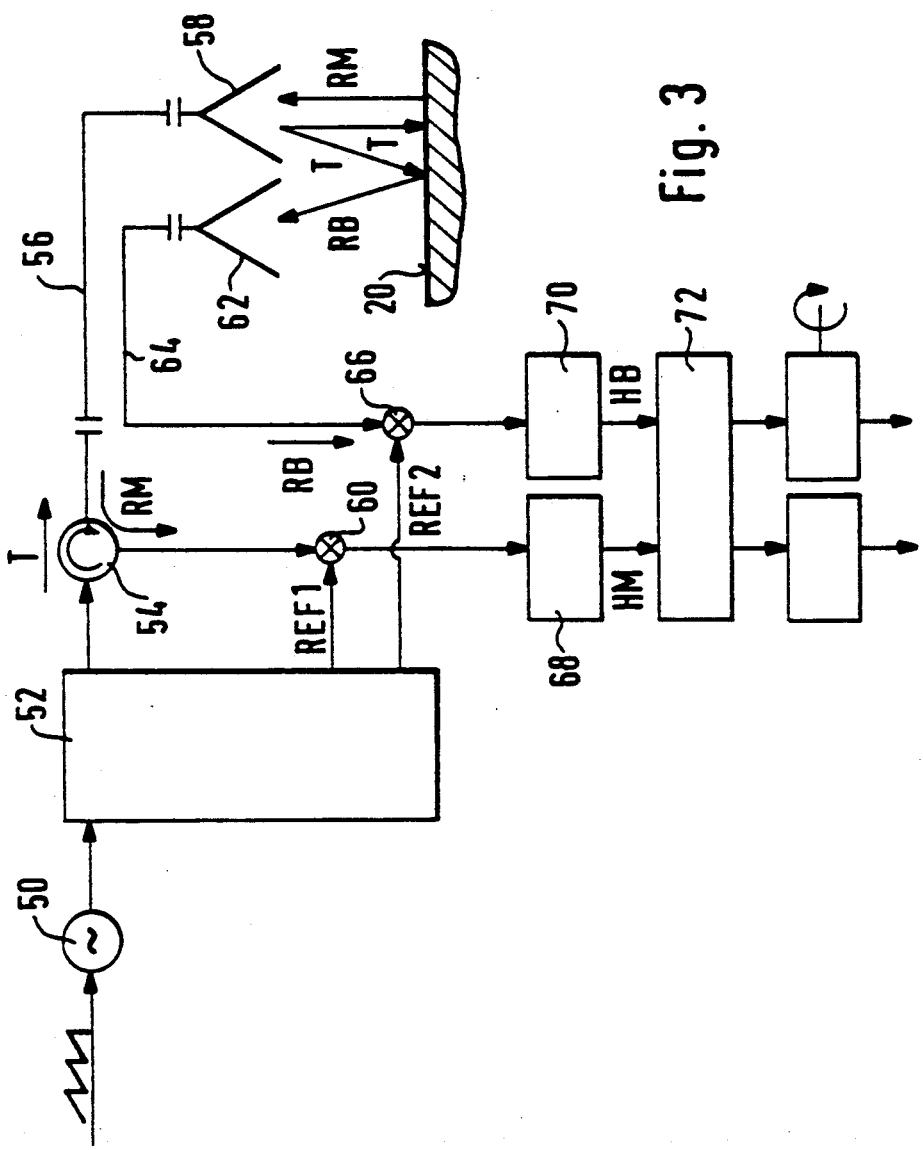
FIG. 3 is a block diagram of a probe according to the present invention which is able to operate in monostatic mode and in bistatic mode.

The antenna proposed by the present invention is shown in the block diagram of FIG. 3 and is a combination of the systems in FIGS. 1 and 2, i.e. monostatic functioning and bistatic functioning are used simultaneously. The probe according to the present invention also comprises a high frequency oscillator 50 for generating a frequency modulated signal which, in a divider 52, is separated into a transmitted signal T and not into one but into two reference signals REF1 and REF2. The transmitted signal T is sent through a waveguide 56 to an antenna 58 which is a transmitting and receiving antenna and which can operate in monostatic mode. This antenna transmits a microwave beam T towards the surface 20 and the reflected signals RM are picked up by this same antenna 58 and returned through the waveguide 56 to a circulator 54 which switches the reflected signal RM towards a first mixer 60 were the reflected signal RM is identified by comparison with the first reference signal REF 1.

A second antenna 62 placed beside the antenna 58 can also pick up reflected signals RB from the beam sent by the antenna 58. These reflected signals RB picked by the antenna 62 are sent through a waveguide 64 to a second mixer 66 in which they are identified by comparison with the second reference signal REF2. The two reflected signals RM and RB are then separately processed in two data processing units 68 and 70, respectively in order to compute, in a manner which is known per se, the distance between the antennas 58, 62 and the reflection surface 20 which, on this occasion, is the loading surface of a shaft furnace. The signal RM produced in monostatic mode and passing through the circulator 54 is essentially used for computing short distances, for which the reflected signal greatly dominates the parasitic signals and can be identified easily. On the other hand, for greater distances at which the angle of reflection of the reflected signal RB is smaller and, because of this, its influence can easily be eliminated in the computation, the signal RB from the antenna 62 is used in the bistatic operating mode. The switching between the two operating modes can be preset at an optimum distance determined theoretically or empirically.

According to an advantageous embodiment, it is possible to use both measurements continuously in order to carry out a mutual control of the latter. Even if one or other of the two signals RM or RB is automatically selected starting from a certain level from the loading surface 20, it is possible to continuously compare the result of the monostatic measurement with that of the result of the bistatic measurement. This allows a rapid detection of an occasional measurement error when the results are substantially different. If this case arises, it is possible to provide for the sending of an alarm signal or to restart the measurements automatically.

As shown in FIG. 3, the measurement results HM and HB the data processing units 68 and 70 are sent to a logic control circuit 72. If, as a result of the comparison of the measurements, HM differs from HB by a predetermined value there is either an alarm signal or a repetition of the measurements. On the other hand, if HM is approximately equal to HB the measurements are displayed or stored.

In brief, it can be said that the radar probe proposed by the present invention and shown in FIG. 3 eliminates the systematic errors of monostatic probes and those of bistatic probes.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A device for telemetric measurement of distance, comprising:
    radar probe means for transmitting and receiving electromagnetic waves, said probe means comprising:
        a transmitting and receiving antenna, and
        a receiving antenna;

first signal processing means for processing input signals received by said transmitting and receiving antenna to provide a first measurement signal;

second signal processing means for processing input signal received by said receiving antenna to provide a second measurement signal; and means for calculating a first measured value for the distance, wherein calculation of the first measured value is based on said first measurement signal if said distance is less than a predetermined threshold and calculation of the first measured value is based on the second measurement signal if the distance is greater than the threshold.

2. The apparatus of claim 1, further comprising:

means for calculating a second measured value for the distance, wherein calculation of the second measured value is based on the second measurement signal of the distance is less than the threshold and calculation if said second measured value is based on the first measurement signal if the distance is greater than the threshold, and comparator means for comparing the first measured value to the second measured value.

3. A method for the telemetric measurement of a distance between a radar probe and a point of reflection, comprising:
  a) transmitting electromagnetic waves from a transmitting and receiving antenna on said probe;
  b) receiving electromagnetic waves reflected from said point with said transmitting and receiving antenna;
  c) receiving electromagnetic waves reflected from said point with a separate receiving antenna on said probe;
  d) processing input signals from said transmitting and receiving antenna to provide a first measurement signal;
  e) processing input signals for said receiving antenna to provide a second measurement signal; and
  f) calculating a first measured value for the distance, wherein calculation of said first measured value is based on said first measurement signal if said distance is below a predetermined threshold and calculation of said first measured value is based on said second measurement signal if the distance is greater than the threshold.

4. The method of claim 3, further comprising:
  g) calculating a second measured value for the distance, wherein calculation of the second measured value is based on the second measurement signal if the distance is less than the threshold and calculation of the second measured value is based on the first measurement signal if the distance is greater than the threshold;
  h) comparing said first measured value to said second measured value.

5. A device for determining a topographic map of a loading surface of a shaft furnace; comprising:
  radar probe means for transmitting and receiving electromagnetic waves, said probe means comprising:
    a transmitting and receiving antenna, and
    a receiving antenna;
  first signal processing means for processing input signals received by said transmitting and receiving antenna to provide a first measurement signal;
  second signal processing means for processing input signal received by said receiving antenna to provide a second measurement signal; and
  means for calculating a first measured value for the distance, wherein calculation of the first measured value is based on said first measurement signal if said distance is less than a predetermined threshold and calculation of the first measured value is based on the second measurement signal if the distance is greater than the threshold.

6. The device of claim 5, further comprising:

means for calculating a second measured value for the distance, wherein calculation of the second measured value is based on the second measurement signal of the distance is less than the threshold and calculation of said second measured value is based on the first measurement signal if the distance is greater than the threshold, and comparator means for comparing the first measured value to the second measured value.

7. A method for determining a topographic map of a loading surface of a shaft furnace; comprising:
  a) transmitting electromagnetic waves from a transmitting and receiving antenna on said probe;
  b) receiving electromagnetic waves reflected from said point with said transmitting and receiving antenna;
  c) receiving electromagnetic waves reflected from said point with a separate receiving antenna on said probe;
  d) processing input signals from said transmitting and receiving antenna to provide a first measurement signal;
  e) processing input signals for said receiving antenna to provide a second measurement signal; and
  f) calculating a first measured value for the distance, wherein calculation of said first measured value is based on said first measurement signal if said distance is below a predetermined threshold and calculation of said first measured value is based on said second measurement signal if the distance is greater than the threshold.

8. The method of claim 7, further comprising:
  g) calculating a second measured value for the distance, wherein calculation of the second measured value is based on the second measurement signal if the distance is less than the threshold and calculation of the second measured value is based on the first measurement signal if the distance is greater than the threshold;
  h) comparing said first measured value to said second measured value.

9. The device of claim 1, wherein said means for calculating include means, responsive to the predetermined threshold, for automatically selecting the first or second measurement signal.

10. The device of claim 5, wherein said means for calculating include means, responsive to the predetermined threshold, for automatically selecting the first or second measurement signal.

11. The method of claim 4, further comprising storing the first measured value, if the first and second measured values agree within a preselected limit.

12. The method of claim 4, further comprising displaying the first measured value, if the first and second measured values agree within the preselected limit.

13. The method of claim 4, further comprising repeating steps a, b, c, d, e, f, g, and h, if the first and second measured values differ by more than a preselected limit.

14. The method of claim 4, further comprising providing an alarm signal if the first and second measured values differ by more than a preselected limit.

15. The method of claim 8, further comprising storing the first measured value, if the first and second measured values agree within a preselected limit.

16. The method of claim 8, further comprising displaying the first measured value, if the first and second measured values agree within the preselected limit.

17. The method of claim 8, further comprising repeating steps a, b, c, d, e, f, g, and h, if the first and second measured values differ by more than a preselected limit.

18. The method of claim 8, further comprising providing an alarm signal if the first and second measured values differ by more than a preselected limit.

* * * * *